May 23, 1939.  A. E. CURRIE  2,159,321
FERTILIZING DEVICE
Filed April 19, 1937  2 Sheets-Sheet 1
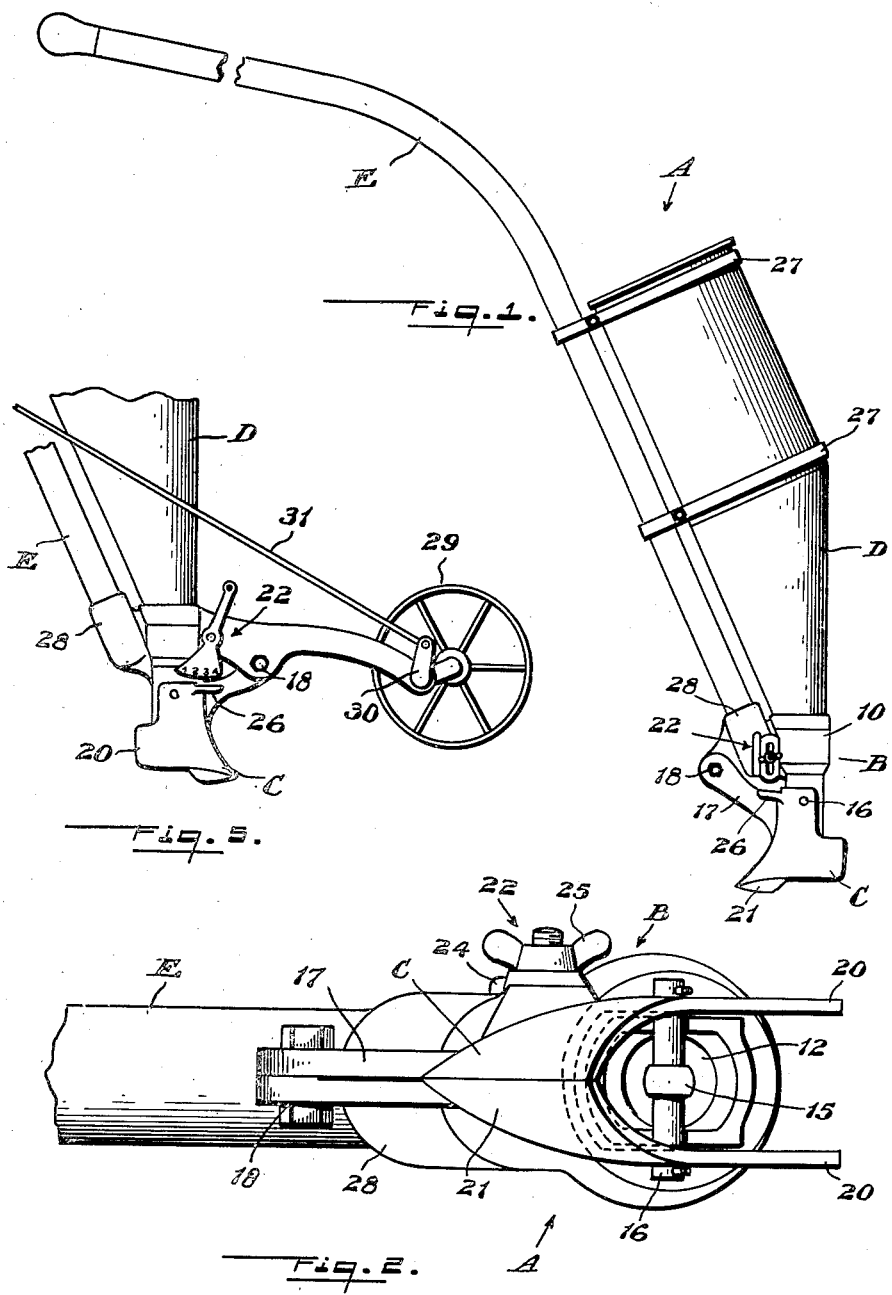
INVENTOR.
Albert E. Currie.

May 23, 1939.  A. E. CURRIE  2,159,321
FERTILIZING DEVICE
Filed April 19, 1937   2 Sheets-Sheet 2

INVENTOR.
Albert E. Currie

Patented May 23, 1939

2,159,321

UNITED STATES PATENT OFFICE 2,159,321

FERTILIZING DEVICE

Albert E. Currie, Ottawa, Ontario, Canada

Application April 19, 1937, Serial No. 137,614
In Canada June 20, 1936

2 Claims. (Cl. 111—82)

This invention relates to fertilizing devices and more particularly to a portable or hand operated device for the application of fertilizers, soil amendments, soil insecticides and like materials to plants, shrubs and field and garden crops so that the most productive results may be obtained in the most practical and economical manner.

In applying fertilizers and like materials, the present general practice is to broadcast it over the surface of the soil then cultivate or hoe it in. In many respects this is a wasteful method not only of the application of the fertilizer but of the added time and operation necessary to effectively incorporate the fertilizer in the soil, moreover, by the broadcast practice the fertilizer does not reach the plant roots where the best results are obtained.

Research in agricultural science has shown that the best results are obtained by placing a fertilizer in the form of a band under the soil adjacent the plant roots. There are two main reasons for this, first, such method enables the plant to obtain the plant food from the fertilizer more easily and quickly and secondly it prevents the damaging of the plant with the fertilizer which may have a caustic effect on the plant when placed on the surface of the soil adjacent the plant.

In order to meet the above requirements, the present invention is designed to place the fertilizer or other agent in a narrow band beneath the soil in close proximity to the plant roots. To accomplish this I have devised means whereby the top soil is penetrated and spread by a shoe like device, the fertilizer inserted and as the device passes on the fertilizer is covered by soil with the result that both material and time are conserved and the fertilizer applied where it is most beneficial.

While the present invention has been described and will be referred to as a fertilizing appliance or device, it will be understood that from its very nature and structure it may be advantageously employed for seeding purposes in the manner of a seed drill or the application of weed killing substances.

Having regard to the foregoing and other objects and advantages which will become apparent as the details become known, the invention consists essentially in the novel combination and arrangement of parts hereinafter described in detail and illustrated in the accompanying drawings in which;

Fig. 1 is a side elevation of an embodiment of the invention as a whole.

Fig. 2 is a bottom plan view enlarged.

Fig. 6 is a section taken on the line 6—6 of Fig. 3.

Referring now to the drawings wherein like letters and numerals designate corresponding parts in the several illustrations, the letter A indicates the fertilizer device as a whole and includes body member B with control mechanism, shoe C, hopper D and operating handle E.

Figures 3, 4:
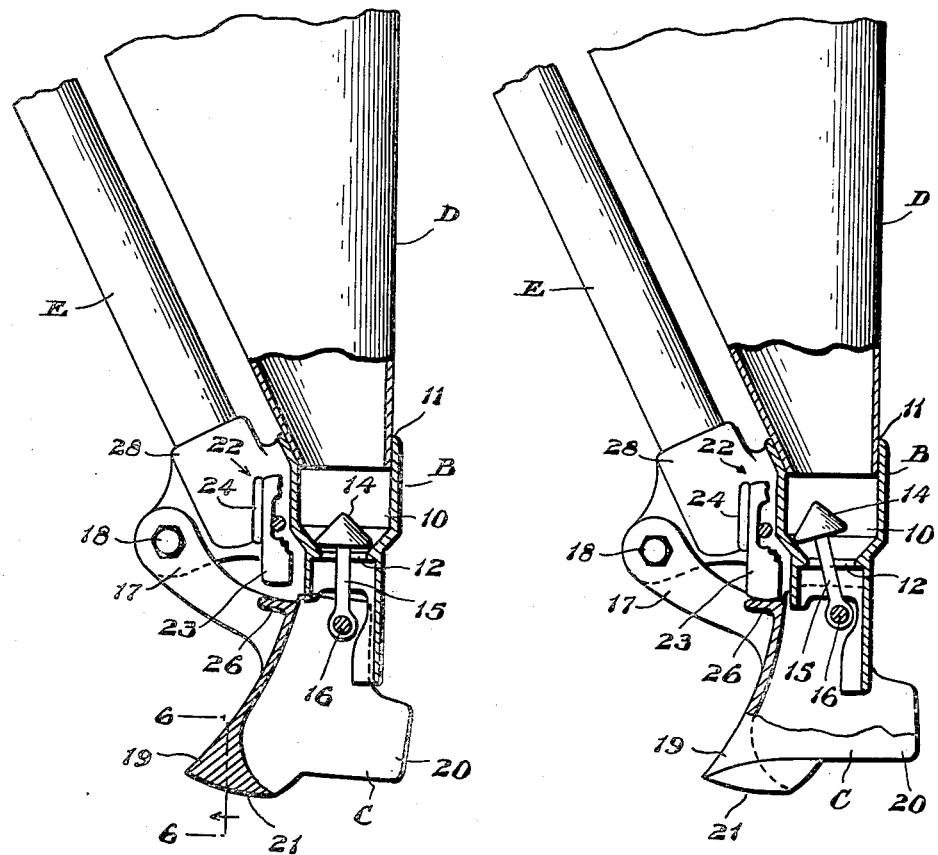
Fig. 3 is a side view of the lower portion of the device partly in section, the feed control valve being shown in closed position.
Fig. 4 is a view similar to Fig. 3 with the feed control valve being shown in open position.

The body member comprises a chamber 10 provided with inlet 11 and outlet 12, the inlet communicating with the hopper D while the outlet provides a means for the discharge or escape of the fertilizing or other materials.

Mounted within the chamber 10 and forming valve or shut-off closure means for the outlet 12 is a co-axially arranged closure member 14. This member or valve, through stem 15 is pivotally connected to a transverse pin or the like 16 which in turn is carried by the shoe C.

Coming now to an essential feature of the invention, this comprises the shoe member previously mentioned which by means of arm 17 is pivotally connected as at 18 to the body member B. In character the shoe is formed with a soil engaging nose 19 and rearwardly extending flanges or wings 20, the base of the nose of the shoe tapering downwardly to form a substantially convex face 21 (see Fig. 6).

From the description thus far given it will be clearly seen that when the device is permitted to rest upon the ground surface or is inserted in the soil, the weight of the associated members upon the pivotally connected shoe, will move the shoe upwardly in relation to the body member as illustrated in Fig. 4 and cause the valve 14 to also move upwardly to open the outlet thus permitting the materials within the chamber to pass to the soil and the passage of such materials will continue until such time as the device is lifted from the soil whereupon the shoe C will move downwardly to the position shown in Fig. 3 closing the outlet 12 and shutting off the flow or discharge of materials.

In employing the device for materials of different physical characteristics, it is necessary to control the rate of flow of materials to the soil. Such control may take any practical and appropriate form and in the present instance I have shown a suitable means in the form of an adjustable stop member 22. The stop means include a slotted plate 23 held in adjusted position by guard 24 and suitable release means such as a thumb nut 25.

Formed integral with the body member C is a projecting lug or abutment 26 which during the upward movement of the shoe member is adapted to engage the lower extremity of the plate 23, thus with the plate 23 set in a predetermined position, the relative movement of the shoe member may be regulated to control the flow of fertilizer or other materials from the device as circumstances and conditions dictate.

Additionally, the stop means may carry identifying indicia in the form of graduations for convenience in regulating the flow of different physical materials. It is also pointed out that other types of stop means such for example as an eccentric may be effectively and satisfactorily employed.

Conveniently, one end of the hopper D is mounted in the inlet opening 11 of the body member and is in turn connected to the handle E by any suitable type of fastening device such as bands or the like 27, the handle in turn being rigidly secured in a socket 28 formed in the body member.

Figure 5:
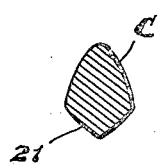
Fig. 5 illustrates an embodiment of the present invention provided with wheel means.

In the device illustrated in Fig. 5, a suitable supporting arm extending from the body member is provided with eccentrically mounted wheel means indicated by the numeral 29. The raising and lowering of the body member with a device of this nature is effected by means of a lever 30 operable through the medium of a rod or like device 31.

In operation, the fertilizer or other material is placed in the hopper and adjustment made with respect to the feed flow. The operator then inserts the shoe in the soil to a required depth in the proper relative position with respect to the plant to be fertilized.

Upon the insertion of the shoe member in the soil, the feed control valve is automatically opened and the fertilizer flows to the soil, the device through the medium of the handle member being drawn forward or in the case of the wheel type, being pushed forward. During this operation the nose of the shoe member forms a path or channel for the reception of the fertilizer which, as the device passes on is closed in by the wings or flanges, thus the fertilizer is inserted and covered in the one simple operation.

Many changes may be made in the above and many apparently widely different embodiments constructed without departing from the spirit or scope thereof. It is intended therefore that all matter herein contained shall be interpreted as illustrative rather than in a limitative sense.

What I claim as my invention is:

1. In a device of the character described, a body member formed with inlet and outlet openings, a closure valve for the outlet opening, a shoe member pivotally connected to the body member, operating means operatively connecting the closure valve with the shoe member and adjustable means for regulating the movement of the closure valve.

2. In a device of the character described, a body member formed with inlet and outlet openings, a closure member adapted on operation to open and close the outlet opening, a shoe member pivotally connected to the body member movable upwardly and downwardly, pivotal connecting means connecting the closure member with the shoe member, adjustable stop means for regulating the movement of the shoe member and handle means for operating the device.

ALBERT E. CURRIE.